United States Patent
Chaffin

[19]

[11] Patent Number: 5,906,766
[45] Date of Patent: May 25, 1999

[54] METHOD FOR DIELECTRICALLY HEATING AN ADHESIVE

[75] Inventor: Kimberly Ann Chaffin, Plymouth, Minn.

[73] Assignee: Ford Global Technologies, Inc., Dearborn, Mich.

[21] Appl. No.: 09/017,490

[22] Filed: Feb. 2, 1998

Related U.S. Application Data

[62] Division of application No. 08/676,601, Jul. 3, 1996, Pat. No. 5,750,970.

[51] Int. Cl.$^6$ .................................................. H05B 6/50
[52] U.S. Cl. ...................... 219/765; 219/779; 156/274.4; 156/380.2
[58] Field of Search ..................................... 219/765, 769, 219/777, 779, 770; 156/272.2, 274.2, 274.4, 274.6, 274.8, 64, 380.3, 380.4, 380.5, 380.6, 380.2

[56] References Cited

U.S. PATENT DOCUMENTS

| | | | |
|---|---|---|---|
| 3,888,715 | 6/1975 | Fraser et al. ............................. | 219/765 |
| 4,391,663 | 7/1983 | Hutter, III ............................... | 156/272.2 |
| 4,867,336 | 9/1989 | Stewart .................................. | 156/272.4 |
| 5,047,605 | 9/1991 | Ogden .................................. | 156/273.7 |
| 5,223,684 | 6/1993 | Li et al. .................................. | 219/765 |
| 5,277,737 | 1/1994 | Li et al. ............................... | 156/274.8 |
| 5,278,382 | 1/1994 | Rische et al. .......................... | 219/779 |
| 5,518,560 | 5/1996 | Li ......................................... | 156/379.6 |
| 5,575,869 | 11/1996 | Fujiwara et al. ..................... | 156/274.8 |

*Primary Examiner*—Philip H. Leung
*Attorney, Agent, or Firm*—Damian Porcari

[57] ABSTRACT

A method of heating an adhesive including the steps of placing a dielectrically heatable adhesive between first and second members. A high frequency electric field is applied between the first and second members sufficient to dielectrically heat the adhesive. The surface temperature of the first member is measured in the vicinity near the adhesive. The electric field is removed after the measured temperature reaches a predefined amount. The invention anticipates measuring the infrared radiation emitted from the surface of the first member and is measured with an infrared detector. A controller receives the measured infrared radiation and compares it to stored values. After the measured temperature reaches a predefined value or values, the controller sends a signal to an RF generator to remove the electric fields.

1 Claim, 1 Drawing Sheet

METHOD FOR DIELECTRICALLY HEATING AN ADHESIVE

This is a Divisional of U.S. Ser. No. 08/676,601, filed Jul. 3, 1996 U.S. Pat. No. 5,750,970.

BACKGROUND OF THE INVENTION

1. Field of the Invention

The present invention relates to a method of dielectrically heating an adhesive. More specifically, the present invention relates to a method of monitoring the state of cure in a dielectrically heatable adhesive.

2. Description of the Related Art

It is known to dielectrically heat an adhesive between two electrodes. A radio frequency (RF) electric field is created by an RF generator. The RF field causes polar and ionic molecules within the adhesive to oscillate and create heat within the adhesive. The method of dielectrically heating an adhesive is described in U.S. Pat. No. 5,277,737, and is incorporated herein by reference. Heretofore, the amount of dielectric heating has either been analytically calculated based on known formulas and properties of the materials being heated, or determined by experimentation. Process variables, including the exact composition of the dielectrically heatable adhesive, thickness of the adhesive layer, the dielectric constant of the members being joined, and environmental factors such as ambient temperature and humidity all influence the rate of dielectric heating. These process variables have not been accounted for in prior devices.

The amount of dielectric heating is directly related to the state of cure of the adhesive. This state of cure determines the amount of dielectric heating required to achieve a desired bond strength. It has previously been known to measure the plate current between the two electrodes to estimate the state of cure of the adhesive. The plate current measurement is an estimation of the average state of cure of the entire bond line. It does not measure the state of cure of a particular area. Sections that have less adhesive, or that are more susceptible to dielectric heating are averaged into the plate current measurement. These areas may experience over or under heating.

It is also known to embed a fiber optic temperature sensor within the adhesive to continuously monitor its temperature. Contact temperature measurements such as the photo optic method described require access to the adhesive through an apature in the part and very expensive and delicate instruments. This temperature measurement process is generally only suitable for experimental or developmental purposes. The temperature sensor often is damaged or trapped in the adhesive.

It is desirable to measure the adhesive temperature without contacting the adhesive or the members to be bonded. It is further desirable to measure the temperature at any point along the mating surfaces between the members. These and other advantages, features and objects of the present invention will be more fully described in the following specifications with reference to the attached drawing.

SUMMARY OF THE INVENTION

The present invention relates to a method of heating an adhesive comprising the steps of placing a dielectrically heatable adhesive between first and second members. A high frequency electric field is applied between the first and second members sufficient to dielectrically heat the adhesive. The surface temperature of the first member is measured in the vicinity near the adhesive. The electric field is removed after the measured temperature reaches a predefined amount. The invention anticipates measuring the infrared radiation emitted from the surface of the first member and is measured with an infrared detector. A controller receives the measured infrared radiation and compares it to stored values. After the measured temperature reaches a predefined amount or amounts, the controller sends a signal to an RF generator to remove the electric fields.

The present invention also teaches an apparatus for heating a dielectrically heatable adhesive placed between first and second members. The fist and second members are made from a material having a lower dielectric loss than the adhesive and is relatively insensitive to dielectric heating. The apparatus comprises two or more electrodes overlying mating surfaces of the first and second members. The high frequency RF generator connected between the first and second electrodes applies an electric field of sufficient intensity to dielectrically heat the adhesive. The adhesive heats the first and second members by radiant heating. A temperature measuring means measures the surface temperature of the first or second member near the mating surfaces. A controller receives the signal from the measuring means and compares it to a predefined amount and sends a signal to the RF generator to remove the electric field when the measured temperature reaches the predefined amount. After the adhesive is sufficiently cured, the first and second members are joined and the part is removed from the apparatus.

DETAILED DESCRIPTION OF THE PREFERRED EMBODIMENTS

Figure 1:
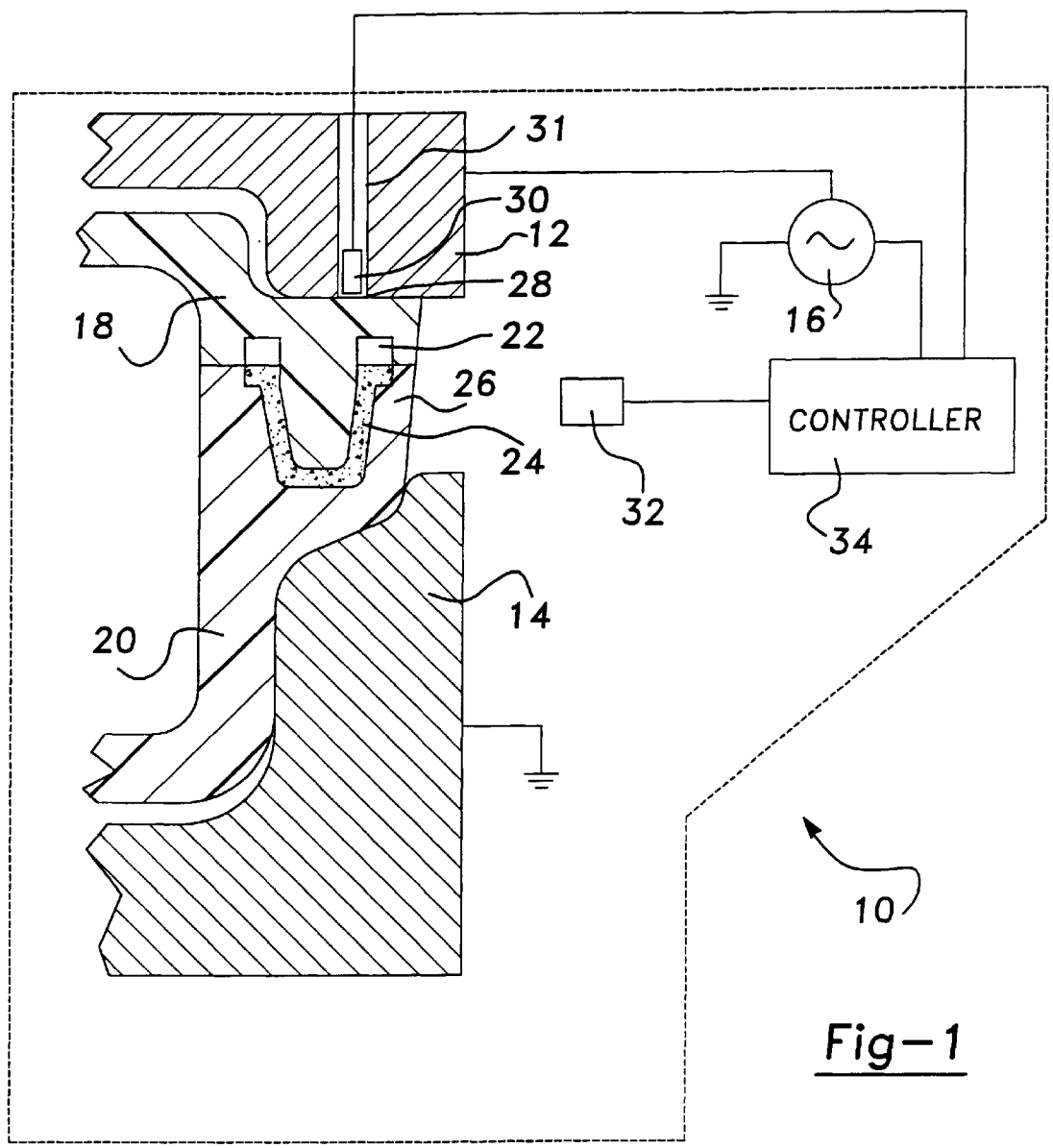
FIG. 1 is a cross-sectional view of an apparatus for dielectrically heating an adhesive.

The present invention is illustrated in FIG. 1. An apparatus 10 receives the members to be joined. Apparatus 10 comprises two electrodes 12, 14. The electrodes 12, 14 are usually made from a conductive material such as aluminum and are connected between an RF generator 16. The electrodes 12, 14 are moveable between an open and a closed position (shown in the closed position). When placed in the open position, the electrodes 12, 14 receive two members 18, 20. When mounted vertically, additional vacuums or pins (not shown) may be useful in retaining the member 18 within the electrode 12. Mating surfaces of the members 18, 20 are generally in the form of a U-shaped channel. The U-shaped channel forms a cavity 22 that receives a dielectrically heatable adhesive 24. The dielectrically heatable adhesive 24 is dispensed between the mating surfaces of the members 18, 20. Suitable adhesives, RF generators and electric fields are described in U.S. Pat. No. 5,277,737 which has been previously incorporated herein by reference.

The generator 16 applies an RF electric field between the electrodes 12, 14. The electrode 12 operates as the antenna and the electrode 14 functions as the receiver. The RF electric field causes the dielectrically heatable thermoset adhesive 24 to heat. The elevated temperature of the adhesive 24 accelerates a cross-linking reaction and causes the adhesive to cure. Other types of thermoplastic adhesives do not cross-link but merely become tacky when heated and may be used with the present invention. Examples of suitable thermoplastic adhesives are described in U.S. patent application Ser. No. 08/544,081 and incorporated herein by reference. The members 18 and 20 have a lower dielectric loss than the adhesive and are relatively less sensitive to dielectric heating than the adhesive 24. Consequently, most of the heating occurs within the adhesive 24 and is transmitted by conductive heating to the members 18, 20. The temperature increase of the adhesive 26 is transmitted through the member 20 to the surfaces 26 and 28. Infrared (IR) detectors 30, 32 are placed near the surfaces 28, 26 respectively. Suitable infrared temperature detectors are commercially available. Of the commercially available IR detectors suitable for the present invention, the model M67/M65S manufactured by Mikron may be used.

To focus on the small area adjacent the bond line, the image viewing area may be reduced by means of a lens which focuses on a smaller portion of surface area (not shown). By means of external lenses, the focal area may be reduced to 0.25 inches in diameter. The IR sensor takes temperature measurements in an area in the bond line with uniform thickness, thereby reducing the effects of heat transfer from the adhesive to the surface 28. The detectors 30, 32 do not contact the surfaces 28, 26 and receive IR energy radiated from the surfaces 26, 28. A detector 30 is located within a passage 31 of the electrode 12 to measure the radiated infrared energy from the surface 28. Placing the detector 30 within the electrode 12 may cause small discontinuities within the electric field but because the size of the detector 30 is sufficiently small, these discontinuities do not significantly effect the uniform heating of the RF field. The radiated infrared energy corresponds to the temperature of the adhesive 24. Detectors 30, 32 send the measured IR energy signal to controller 34. Controller 34 has stored within it predetermined amounts of IR signals that correspond to cured or melted adhesive measurements. When the signals received from the IR detectors 30, 32 reach predefined amounts, controller 34 signals RF generator 16 to remove the RF field. These predefined amounts are usually derived from analytical calculations or prior contact measures for desired adhesive temperatures. The predefined amounts may be a single temperature reading in a critical area, or a series of temperature readings corresponding to a desired adhesive heating curve. The heating curve could tailor the heating process to include time and temperature measurements for different areas along the bond line.

The rate of RF heating in the adhesive 24 varies with the formulation of the adhesive, the intensity the RF field, the dielectric loss factors of members 18, 20 and environmental factors such as humidity and ambient temperature. These factors make repeatable heating based on a static heating curve less efficient than one based on the measured heating of the adhesive. The measured heating provides a feedback control to RF generator 16 to reduce the overall cycle time needed for bonding the members while providing a consistent and known heating profile in the adhesive.

In comparisons between measuring the IR energy emitted from the surfaces 26, 28 against actual measurements of adhesive 24, the IR measurements showed a time lag between the radiant heating measurement and the actual heating measurement. This time lag is due to the insulating properties of the members 18, 20. The invention is particularly useful in bonding plastic members. The plastic material is selected to be less sensitive to dielectric heating than the adhesive. The invention may also be used for bonding plastic materials having a higher dielectric loss factor, but care must be taken in the electrode design and placement to avoid excessive heating in the plastic material. Heating the plastic material directly by the RF field may give inaccurate measurements of the adhesive temperature.

While plastic materials are generally a poor conductor of heat, the thickness of the members 18, 20 in the vicinity of the cavity 22 is generally thin enough to allow heat to be transmitted through the members to the surfaces 26, 28. The predefined values stored in the controller 34 compensate for the delay in transmitting heat from the adhesive 24 to the surfaces 26, 28.

While certain representative embodiments and details have been shown for purposes of illustrating the invention, it will be apparent to those of ordinary still in the art that various changes in the methods and apparatus described herein may be made without departing from the spirit and scope of the invention which is defined by the appended claims.

What is claimed:

1. An apparatus for heating a dielectrically heatable adhesive placed between first and second members, said first member being made from a material having a lower dielectric loss than said adhesive and being relatively insensitive to dielectric heating comprising:

two or more electrodes overlying matting surfaces of said first and second members;

a high frequency RF generator connected between said first and second electrodes, said RF generator applying an electric field sufficient to dielectrically heat said adhesive, said adhesive heating said first member by radiant heating;

an IR temperature measuring detector measuring the radiated IR surface temperature energy of said first member from a surface opposite to said matting surface; and a controller receiving a signal from said measuring means and comparing it to a predefined amount and sending a signal to said RF generator to remove said electric field when said measured temperature reaches said predefined amount, whereby said controller estimates the adhesive temperature based on the radiant energy of said first member opposite surface and said IR measuring detector need not contact said adhesive.

* * * * *